United States Patent
Posey

(10) Patent No.: US 6,816,738 B2
(45) Date of Patent: Nov. 9, 2004

(54) DISPOSABLE WIRELESS COMMUNICATION SYSTEM

(76) Inventor: Sonya Posey, 30 Bailey St., Stoughton, MA (US) 02072

( * ) Notice: Subject to any disclaimer, the term of this patent is extended or adjusted under 35 U.S.C. 154(b) by 405 days.

(21) Appl. No.: 09/815,818

(22) Filed: Mar. 23, 2001

(65) Prior Publication Data

US 2002/0137555 A1 Sep. 26, 2002

(51) Int. Cl.[7] .................... H04M 11/00; H04M 1/00; H04M 1/66
(52) U.S. Cl. .............. 455/550.1; 455/409; 455/410; 455/572; 455/575.1
(58) Field of Search .................. 455/575.1, 572, 455/90.3, 409, 410, 405, 406, 407, 408, 418, 26.1, 550.1, 558, 559

(56) References Cited

U.S. PATENT DOCUMENTS

| | | | |
|---|---|---|---|
| D356,101 S | | 3/1995 | Arai |
| D363,078 S | | 10/1995 | Fukuda |
| D381,348 S | | 7/1997 | Tanaka |
| 5,815,807 A | * | 9/1998 | Osmani et al. ............. 455/410 |
| 5,818,915 A | | 10/1998 | Hayes, Jr. et al. |
| 5,839,058 A | * | 11/1998 | Phillips et al. ........... 455/575.1 |
| 5,870,459 A | | 2/1999 | Phillips et al. |
| 5,875,393 A | * | 2/1999 | Altschul et al. ............ 455/407 |
| 5,946,613 A | | 8/1999 | Hayes, Jr. et al. |
| 5,966,654 A | | 10/1999 | Croughwell et al. |
| 6,061,580 A | * | 5/2000 | Altschul et al. ......... 455/575.1 |
| 6,112,077 A | * | 8/2000 | Spitaletta et al. ........... 455/407 |
| 6,477,361 B1 | * | 11/2002 | LaGrotta et al. ......... 455/343.1 |
| 6,490,458 B1 | * | 12/2002 | Campbell ................... 455/463 |
| 6,594,370 B1 | * | 7/2003 | Anderson ................... 381/315 |
| 6,647,255 B1 | * | 11/2003 | Nilsson ..................... 455/409 |
| 6,670,884 B1 | * | 12/2003 | Tett ............................ 340/7.1 |

FOREIGN PATENT DOCUMENTS

| | | | | |
|---|---|---|---|---|
| JP | 10051858 A | * | 2/1998 | ........... H04Q/7/38 |
| WO | WO 98/38810 | * | 9/1998 | ........... H04Q/7/38 |

* cited by examiner

*Primary Examiner*—William Trost
*Assistant Examiner*—Meless Zewdu
(74) *Attorney, Agent, or Firm*—Lambert & Associates; Gary E. Lambert

(57) ABSTRACT

A disposable wireless communication system is disclosed. This system features the capabilities of a wireless telephone with freedom from expensive service contracts. The user is obtains the unit with a predetermined usage period set in the system and upon expiration of the usage period, the user simply discards the system.

6 Claims, 4 Drawing Sheets

DISPOSABLE WIRELESS COMMUNICATION SYSTEM

FIELD OF THE INVENTION

The present invention relates generally to wireless and cellular communication systems and in particular to a telephone that permits users to communicate by telephone within the limits of time and thereafter the telephone is discarded.

BACKGROUND OF THE INVENTION

In the past, recyclable wireless telephones have been employed as a viable means of communication. Although prior art recyclable/disposable wireless or cellular telephones were convenient, the normal mode of usage for prior art designs, as illustrated in U.S. Pat. No. 5,966,654, encompassed existing as a plurality of telephones used in a network environment. This arrangement has made ownership of an individual disposable telephone, for use outside of a network, unfeasible.

A further drawback of prior art disposable wireless or cellular telephone systems is that, in some capacity, the consumer is forced to contract with a service provider. Contracting for service in this manner can often prove expensive, tenuous and encumbering to an individual who only needed telephone service for a short period.

Finally, in prior art disposable telephone systems, as illustrated in U.S. Pat. No. 5,839,058, the telephone was designed to be rechargeable and therefore, upon expiration of the time period purchased, the consumer would have to return to the telephone to the provider for refurbishing or recharging. Thus causing the user extra expense and loss of time.

What is needed is a truly disposable telephone system. This system should be capable of disposal upon expiration of a designated usage period, without the need to return the telephone to the provider. The system, as designed to be governed by a usage period, should be available to the consumer in a range of quantities, in order to meet the requirements of the specific user.

SUMMARY OF THE INVENTION

The present invention relates to an inexpensive, disposable wireless communication system, designed for ease of use, along with ease of disposal. Unlike prior disposable or rechargeable wireless telephone systems, the instant disposable wireless telephone allows the consumer to purchase the telephone and avail herself of the telephone's benefits without having to arrange for a service contract.

The disposable wireless communication system also allows the consumer to realize how much usable time is available on the system without having to contact a systems administrator or memory system. The disposable cell phone requires no monitoring or data storage capacity, hence, no memory chips are needed.

In view of the instant system regarding less sophisticated circuitry system as compared to the prior cellular telephone systems, the short life expectancy, and the abolishment of the need to return the instant system to the distributor, the system can be manufactured in a less expensive manner and offered for sale at a local pharmacy, department store, grocery store, and/or placed in hotel lobbies.

The consumer is informed of the amount of usage time remaining on the system by a digital output on the front panel of the telephone. Disablement of communication capabilities may be achieved in several manners. A protective mechanism that disables the system upon opening the back casing panel is installed. This mechanism is integral in order to insure that new batteries cannot be installed, since upon expiration of the designated time period, service will no longer be provided.

DETAILED DESCRIPTION OF THE PREFFERED EMBODIMENT

The present invention is described and illustrated herein with specific reference to a disposable wireless communication system. The description of the present invention with respect to a wireless communication system is to be taken as an illustration of the scope of the present invention as described in FIGS. 1–4.

The present invention demonstrates a disposable wireless communication system comprising, a wireless telephone system 1, an actuation mechanism, a predetermined telephone service account, wherein said account presents a user with the ability to send and receive telephonic communications upon actuation of said system.

Figure 1:
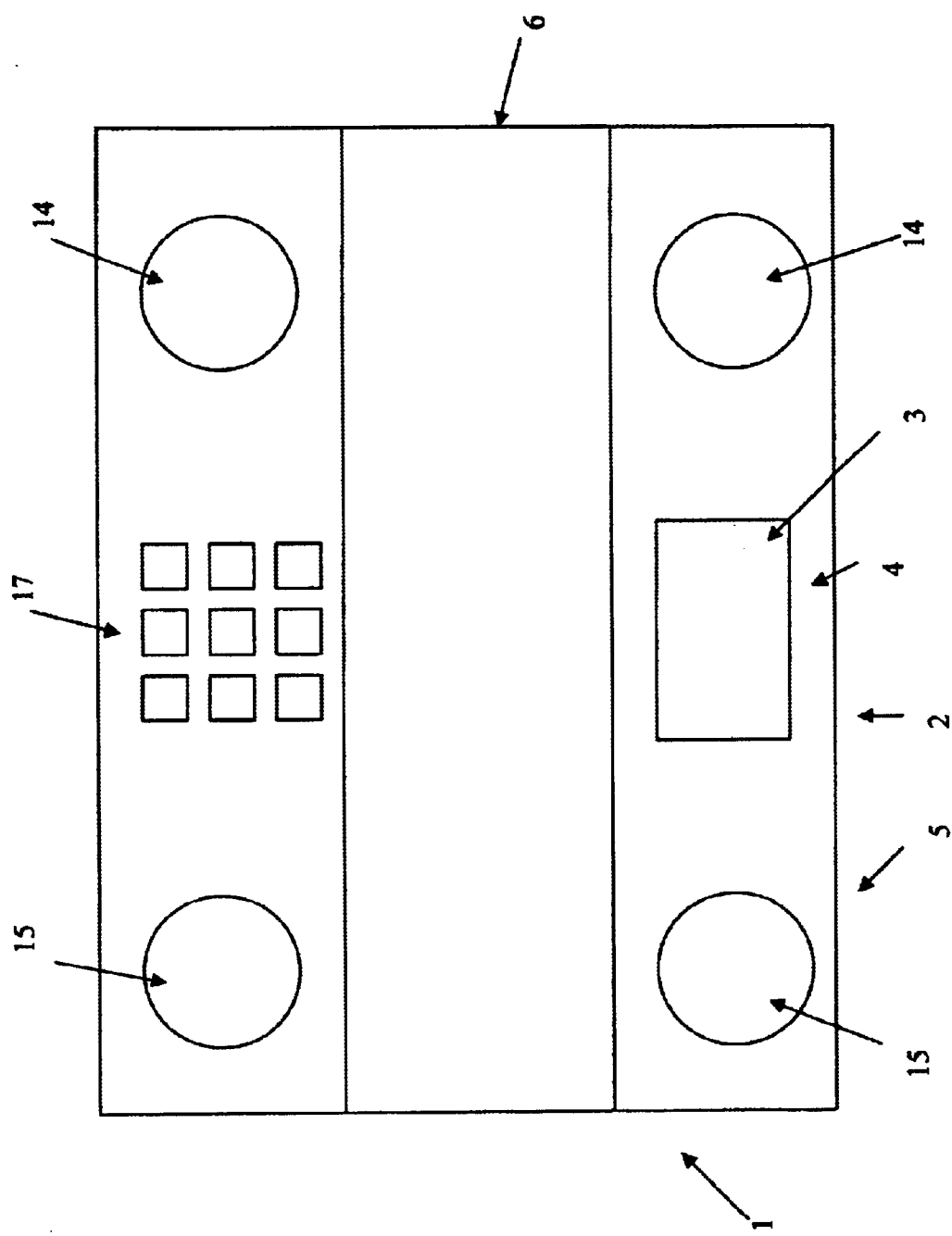
FIG. 1 is an exploded perspective view of the disposable cellular telephone of the present invention.

Referring to FIG. 1, the unassembled wireless telephone system 1 has an inner structural frame 2 preferably made of rigid material. This rigid material for the frame 2 may comprise a sturdy, electrically conductive material. Alternatively, the frame 2 may be formed of a nonconductive material and plated or covered on front and back surfaces with an electrically conductive coating. The frame 2 protects and provides shielding for the electrical components 3 necessary for user to obtain telephone service. The electrical components 3, which include a printed circuit board, are mounted to a support member 4, mounted to the frame 2. In another embodiment, the frame 2 may itself comprise the support member 4 for the electrical components 3.

The wireless telephone system 1 further includes an outer casing 6, which serves as a housing for the wireless telephone system 1. In the present invention, the entire wireless telephone system 1 with its electrical components 3 can be thrown away after expiration of the prescribed usage period. Alternatively, the wireless telephone system 1 can be returned to the manufacture to be recycled.

In the present invention, the outer casing 6 may be made of light-weight clear, non-shatter-proof plastic, recyclable material. The outer casing 6 in the present invention provides a contiguous, attached covering about the frame 2 throughout the use of the system 1. When the outer casing 6 becomes separated and unattached, the user then can no longer make a telephone call. This is an integral feature of the system 1, since it is important to prevent fraudulent usage or as mentioned above installation of new batteries.

Figure 3B:
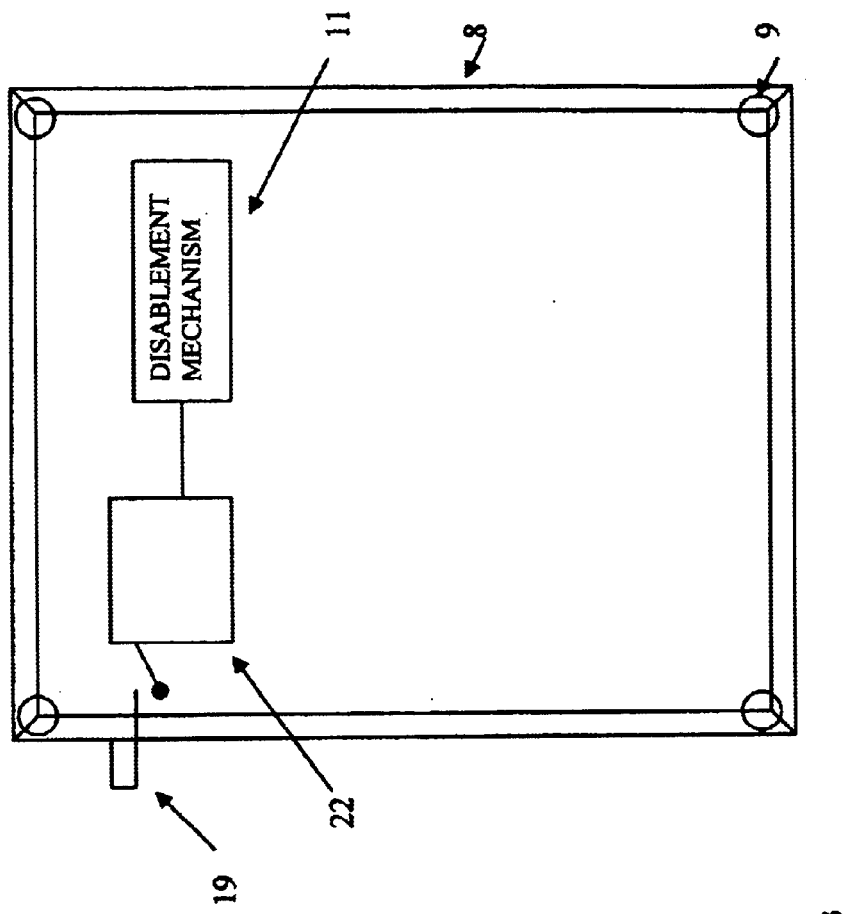
FIG. 3B is a rear view of the outer casing of the disposable cellular telephone.
Figure 3A:
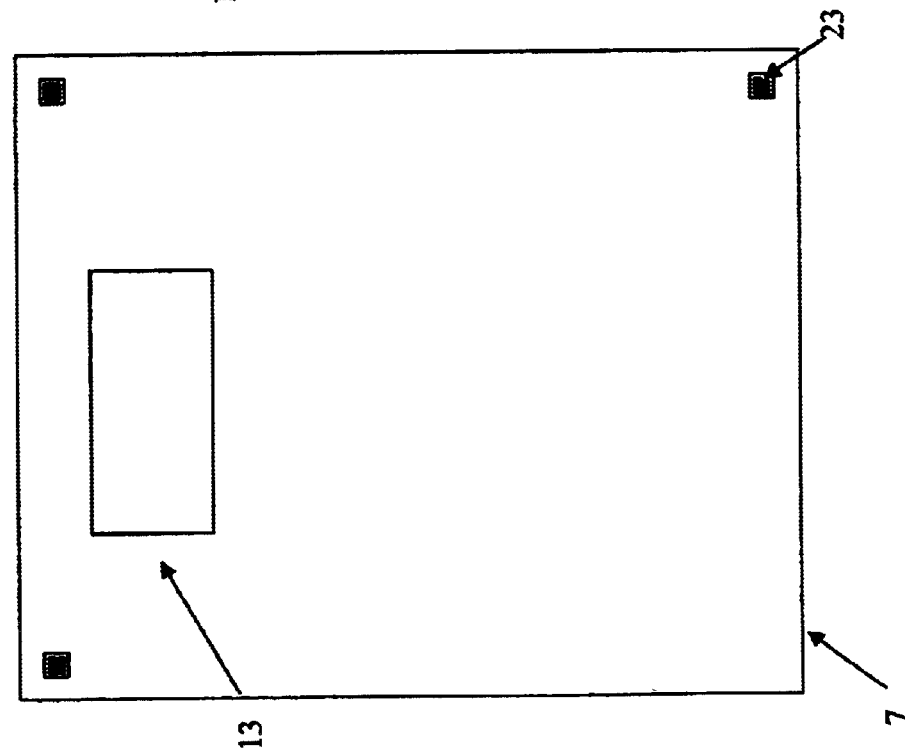
FIG. 3A is a front view of the outer casing of the disposable cellular telephone.

Reference is now made to FIG. 3A wherein is shown the outer casing 6, which includes a front panel 7. Referring to FIG. 3B, the back panel 8 of the outer casing is shown. The front panel 7 is positioned during assembly of the disposable wireless telephone system 1 to provide a front surface for the telephone. The back panel 8 is positioned during assembly of the disposable telephone to provide a back configuration of four loops, designated at each of four corners, is preferred.

To complete assembly of the outer casing 6, a thin gauge, metal wire 10 is placed through the loop 9. Once interlaced through the loop 9, the metal wire 10 is next attached to a disablement device 11, which is in communication with the power source, namely a battery 12, which is internally housed within the frame 1 and electrically connected to the electrical components 3 of the circuit board. The system may be designed to operate utilizing a battery 12 with a finite lifespan. In this way, predetermined periods of time may be allotted for communication, installing a finite lifespan battery.

Once the back panel 8 is sealed and the metal wire 10 is in the above-described position, any breach of the back panel 8 will break the connection of the metal wire 10, and signal the disablement mechanism 11. The disablement mechanism 11 will then disable the battery, rendering the system permanently inoperative. A message will be displayed to the user, by way of a Light Emitting Diode readout, (LED display) 13 or such other device known in the art, informing the user of the battery expiration. The power to put forth the signal to the display 13 may be supplied by a capacitor, installed in the system to hold a charge and deliver upon disablement. Examples of said messages could include such colloquialisms as, "SYSTEM HAS BEEN DISABLED" or "BATTERY HAS EXPIRED." This same mechanism may also be installed to the front panel 7 in order to protect from intrusion or attempted battery replacement.

In another embodiment, one end of the metal wire 10 may further be in direct communication with the battery 12 and the antenna, thus providing power for the antenna. In another embodiment, the loops 9 may be replaced by adhesive rectangles 23, which upon sealing of the back panel, will act to restrain the metal wire 10 in the same manner as the loops 9. Thus the same disablement evolution will occur when the back panel 8 is removed.

Figure 2:
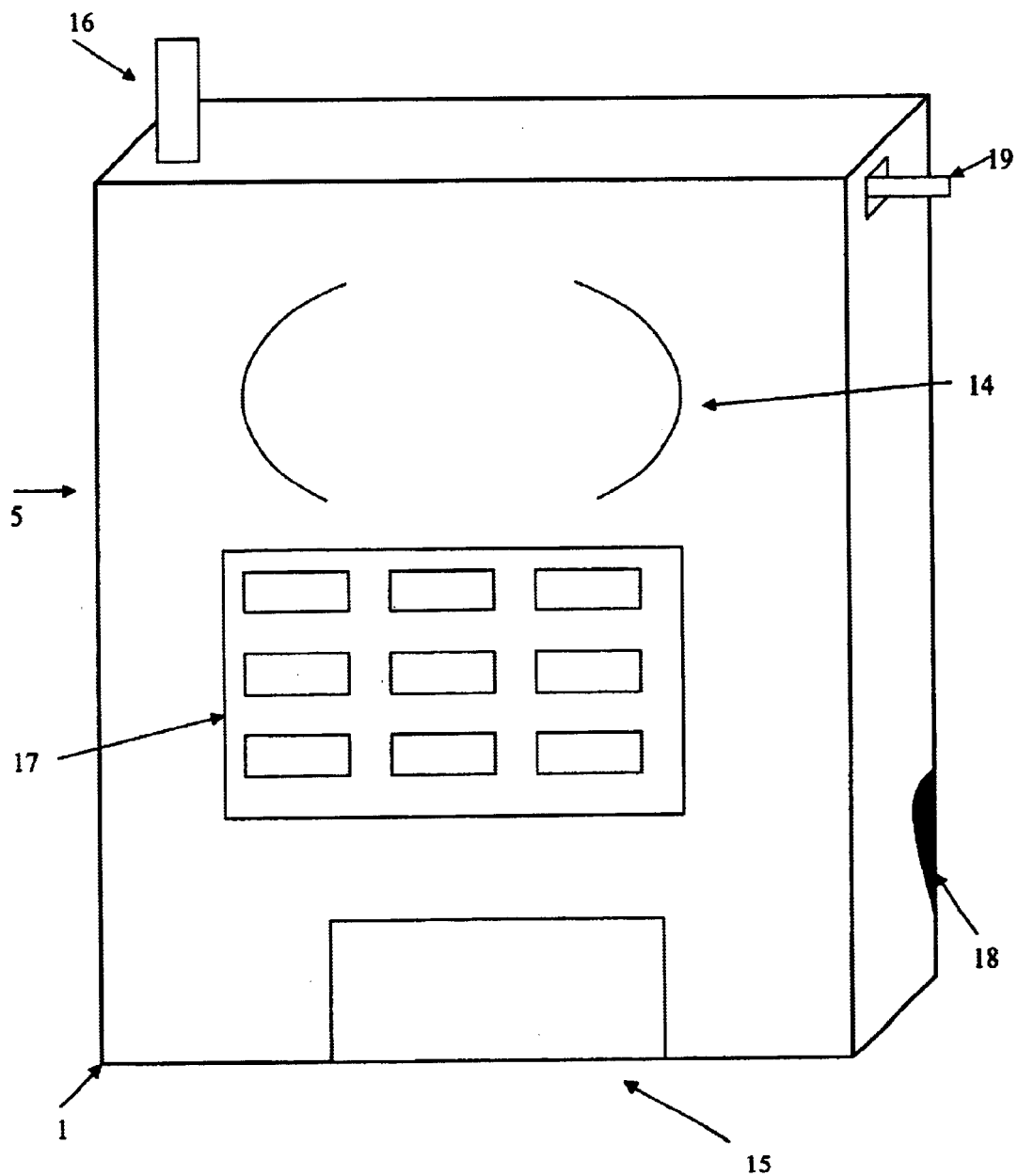
FIG. 2 is an assembled perspective view of the disposable cellular telephone.

FIG. 2. illustrates the assembled wireless telephone system 1. The electrical components 3 of the wireless telephone system 1 include a speaker and earpiece assembly 14 mounted to the circuit board and attached to of the outer casing 6. The electrical components 3 of the present invention further include a microphone 15 mounted to the circuit board. The microphone 15 is provided in the lower portion of the outer casing 6. The electrical components 3 still further include a permanently fixed antenna 16 mounted to the outer casing 6 electrically connected to the circuit board.

The electrical components 3 of the disposable wireless telephone system 1 also include a keypad 17 mounted on the circuit board and the middle portion of the outer casing 6. The keypad 17 may comprise any one of a number of keypad types as used in the industry and may be manufactured from a rubber material and may also be manufactured from transparent material. The system may include a lighted keypad 17 wherein light is provided when user presses and holds a button 18 affixed to the front right side of the outer casing 6.

The present invention may further include an on/off switch 19, which allows the user to manually actuate the battery 12. As stated above, it is not envisioned that conventional operation of the disposable wireless telephone system 1 will require user replacement of the battery 12.

Figure 4:
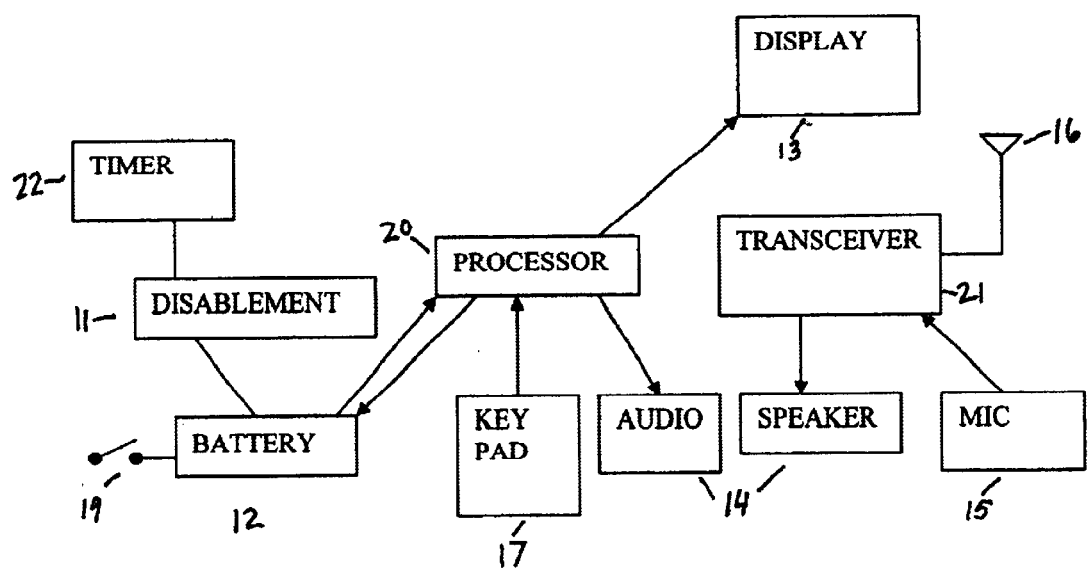
FIG. 4 is a block diagram of the disposable cellular telephone.

Reference is now made to FIG. 4, a block diagram of the electrical components 3 for the disposable wireless telephone system 1. The electrical components 3 include a processor (CPU) 20 connected to a variety of channels of a particular wireless telephone network air interface. The processor 20 emits an output signal that selects the channel on which the transceiver 21 operates for communication over the air. The antenna 16 is connected to the transceiver 21 for receiving and transmitting radio communications. To facilitate telephonic voice communications, the speaker 14 and microphone 15 for the wireless telephone system 1 are connected to the transceiver 21. The keypad 17 acts as the entry of operation commands and is connected to the processor 20.

The system may comprise multiple disablement mechanisms. In one embodiment, as mentioned above, an on/off switch 19 as used in the industry for conventional cellular telephones may be installed. The switch may be used to actuate and disable the telephone while battery power and service is provided to the system.

During operations, an actuation mechanism such as an on/off switch 19 is utilized to activate the system. Upon positioning of the on/off switch 19 to the on position, the display 13 will inform the user of the amount of usable time left on the system. This allows the user to be informed of the status of the disposable wireless telephone system, without having to contact a systems administrator or memory system. Thus, the system 1 requires no monitoring or data storage capacity, and hence, no memory chips are needed.

In one embodiment, the telephone system may be disabled upon expiration of a battery mechanism 12, designed to expire upon a predetermined amount of time. The battery mechanism 12 may be designed to expire after fifteen minutes of usage or thirty minutes of usage, depending on the choice of battery.

In another embodiment, the wireless telephone system 1 may be disabled by a service provider, after a predetermined period of usage. This period may include fifteen minutes or thirty minutes.

In still another embodiment, a timer may control the wireless telephone system 1. The system may comprise a timer mechanism 22 in communication with said battery 12. The timer mechanism is in communication with a disablement mechanism 11 and said disablement mechanism 11 is in communication with said battery 12.

In one embodiment, upon fifteen minutes or thirty minutes of system usage, said timer mechanism 22 sends a signal to said disablement mechanism 11 and said battery 12 is disabled. In another embodiment, the timer mechanism 22 is also in communication with the display 13, which exhibits the amount of time available for telephonic communications and as stated above indicates when said disposable wireless telephone system has been disabled.

In another embodiment, a magnetic bar code may be stamped on to the disposable wireless telephone in order to provide a means of identifying the telephone such that the user may redeem the telephone for recycling or other such purposes.

The above-preferred embodiments considered, it will be observed that numerous different configurations and alternatives may be achieved with out straying from the scope of the original invention. With this in mind, it is stated that no limitation with respect to the specific apparatus illustrated herein is intended or should be inferred. It is, of course, intended to cover by the appended claims all such modifications as are covered by the scope of the claims. The present invention is therefore capable of modifications that will not result in a departure from the spirit of the invention as set forth and defined by the following claims.

I claim:

1. A disposable wireless communication system comprising:
   a wireless telephone system;
   an actuation mechanism;
   a predetermined telephone service account; wherein said account presents a user with an ability to send and receive telephonic communications upon actuation of said system;
   a disablement mechanism;
   an outer casing;
   a back panel; and
   a metal wire in communication with said back panel at a plurality of points;
   wherein removal of said back panel from said outer casing breaks said connection between said back panel and said metal wire;
   wherein any break in communication between said metal wire and said back panel disables said wireless communication system.

2. The disposable wireless communication system of claim 1 wherein said metal wire is in communication with a power source.

3. The disposable wireless communication system of claim 2 wherein said metal wire is in communication with an antenna.

4. The disposable wireless communication system of claim 1 wherein said back panel further comprises a plurality of loops to restrain said metal wire.

5. The disposable wireless communication system of claim 1 wherein said back panel further comprises a plurality of adhesive rectangles to restrain said metal wire.

6. The disposable wireless communication system of claim 1 wherein said back panel comprises four of said loops to restrain said metal wire.

* * * * *